US012750592B2

(12) United States Patent
Itoh

(10) Patent No.: US 12,750,592 B2
(45) Date of Patent: Sep. 29, 2026

(54) IMAGE PROCESSING APPARATUS, CONTROL METHOD THEREOF, AND NON-TRANSITORY COMPUTER-READABLE STORAGE MEDIUM

(71) Applicant: CANON KABUSHIKI KAISHA, Tokyo (JP)

(72) Inventor: Yasuhiro Itoh, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 403 days.

(21) Appl. No.: 18/487,212

(22) Filed: Oct. 16, 2023

(65) Prior Publication Data

US 2024/0155249 A1 May 9, 2024

(30) Foreign Application Priority Data

Nov. 9, 2022 (JP) ................................ 2022-179740

(51) Int. Cl.

*H04N 23/73* (2023.01)
*G06F 3/14* (2006.01)
*G06T 7/70* (2017.01)
*G06V 10/60* (2022.01)
*G09G 3/32* (2016.01)

(52) U.S. Cl.

CPC ............... *H04N 23/73* (2023.01); *G06F 3/14* (2013.01); *G06T 7/70* (2017.01); *G06V 10/60* (2022.01); *G09G 3/32* (2013.01)

(58) Field of Classification Search

CPC .......... H04N 23/73; H04N 23/60; G06F 3/14; G06F 3/1446; G06T 7/70; G06V 10/60; G09G 3/32; G09G 5/10; G09G 2320/0233; G09G 2320/0271; G09G 2320/0285; G09G 2320/0693

See application file for complete search history.

(56) References Cited

U.S. PATENT DOCUMENTS 10,013,791 B2 7/2018 Itoh
10,210,643 B2 2/2019 Itoh
10,313,605 B2 6/2019 Itoh
2013/0063575 A1* 3/2013 Jia ........................ H04N 13/327 348/51
2014/0146069 A1* 5/2014 Tan ..................... G06F 3/04845 345/589
2023/0260480 A1* 8/2023 Hochman ............. G09G 3/006 345/589

FOREIGN PATENT DOCUMENTS

JP 2009-128381 A 6/2009
JP 2012-042804 A 3/2012

* cited by examiner

*Primary Examiner* — Sinh Tran
*Assistant Examiner* — Angel L Garces-Rivera
(74) *Attorney, Agent, or Firm* — Venable LLP

(57) ABSTRACT

An image processing apparatus comprises an acquisition unit configured to acquire information relating to position and orientation of an image capturing apparatus configured to capture an image of a subject with an image displayed on a display apparatus as a background, a calculation unit configured to calculate a correction coefficient corresponding to each display element included in the display apparatus, based on display position of the display apparatus and the information acquired by the acquisition unit, and a correction unit configured to correct, by the correction coefficient calculated by the calculation unit, a pixel value of each pixel in an image displayed on the display apparatus.

12 Claims, 12 Drawing Sheets

FIG. 9

| ANGLE | R ELEMENT CORRECTION AMOUNT | G ELEMENT CORRECTION AMOUNT | B ELEMENT CORRECTION AMOUNT |
|---|---|---|---|
| -80 | 1.41 | 1.40 | 1.54 |
| -60 | 1.24 | 1.24 | 1.35 |
| -45 | 1.12 | 1.11 | 1.19 |
| -30 | 1.05 | 1.04 | 1.10 |
| 0 | 1.00 | 1.00 | 1.00 |
| 30 | 1.05 | 1.07 | 1.05 |
| 45 | 1.11 | 1.16 | 1.12 |
| 60 | 1.22 | 1.30 | 1.27 |
| 80 | 1.40 | 1.45 | 1.43 |

FIG. 10

| PANEL POSITION | R CORRECTION AMOUNT | G CORRECTION AMOUNT | B CORRECTION AMOUNT |
|---|---|---|---|
| (1,1) | 1.01 | 1.02 | 1.01 |
| (1,2) | 0.99 | 1.11 | 1.02 |

FIG. 13

| EXPOSURE CHANGE VALUE [STEP] | ILLUMINATION OUTPUT CORRECTION AMOUNT |
| --- | --- |
| +2/3 | 10 |
| +1/3 | 5 |
| ±0 | 0 |
| -1/3 | -5 |
| -2/3 | -10 |

IMAGE PROCESSING APPARATUS, CONTROL METHOD THEREOF, AND NON-TRANSITORY COMPUTER-READABLE STORAGE MEDIUM

BACKGROUND OF THE INVENTION

Field of the Invention

The present invention relates to an image processing technique for virtual production in which a display apparatus such as an LED wall and an image capturing apparatus such as a camera are combined.

Description of the Related Art

Conventionally, a technique is known by which an image on a display monitor is corrected depending on a position of an observer (Japanese Patent Laid-Open No. 2012-42804 and Japanese Patent Laid-Open No. 2009-128381). In the technique described in Japanese Patent Laid-Open No. 2012-42804 and Japanese Patent Laid-Open No. 2009-128381, the position of the observer is acquired by using an image capturing apparatus such as a camera, and the image on the display monitor is corrected based on the acquired position information.

In addition, a method (virtual production), in which an image is displayed on a display apparatus formed of a plurality of LED panels such as those represented by an LED wall and the image is captured by a camera, is recently getting widely used in the field of image production. In the virtual production, motion and a line-of-sight of the camera are measured in real-time, and the image displayed on a part of the LED wall, which is included in the angle-of-view of the camera, is changed in real-time. And in the method of virtual production, the image on the LED wall is captured by the camera, and then an image as if an actual object were existing there can be captured.

Display elements (LED elements) forming pixels of an LED wall, which is often used in virtual production, have directional characteristics. Therefore, luminance is high when the LED wall is observed from the front, whereas luminance is low when the LED wall is observed from an oblique direction. In addition, the LED wall used in the virtual production is usually formed of a plurality of LED panels as described above. However, the display monitor to be corrected in the known techniques is a display apparatus formed of a single panel, and thus there is a problem that an unnatural background image is displayed when an LED wall formed of a plurality of LED panels is used.

SUMMARY OF THE INVENTION

The present invention is intended to provide a technique that allows for performing image capturing of a subject with a natural background image being displayed on a display apparatus.

According to the first aspect of the present invention, there is provided an image processing apparatus comprising: an acquisition unit configured to acquire information relating to position and orientation of an image capturing apparatus configured to capture an image of a subject with an image displayed on a display apparatus as a background; a calculation unit configured to calculate a correction coefficient corresponding to each display element included in the display apparatus, based on display position of the display apparatus and the information acquired by the acquisition unit; and a correction unit configured to correct, by the correction coefficient calculated by the calculation unit, a pixel value of each pixel in an image displayed on the display apparatus.

According to the second aspect of the present invention, there is provided a control method for an image processing apparatus, comprising: acquiring information relating to position and orientation of an image capturing apparatus configured to capture an image of a subject with an image displayed on a display apparatus as a background; calculating a correction coefficient corresponding to each display element included in the display apparatus, based on display position of the display apparatus and the information being acquired; and correcting, by the correction coefficient being calculated, a pixel value of each pixel in an image displayed on the display apparatus.

According to the third aspect of the present invention, there is provided a non-transitory computer-readable storage medium storing a computer program configured to, when the computer program being read and executed by a computer, cause the computer to: acquire information relating to position and orientation of an image capturing apparatus configured to capture an image of a subject with an image displayed on a display apparatus as a background; calculate a correction coefficient corresponding to each display element included in the display apparatus, based on the display position of the display apparatus and the information being acquired; and correct, by the correction coefficient being calculated, a pixel value of each pixel in an image displayed on the display apparatus.

Further features of the present invention will become apparent from the following description of exemplary embodiments with reference to the attached drawings.

BRIEF DESCRIPTION OF THE DRAWINGS

FIG. 9 is a table illustrating multi-angular property information of output luminance of an LED element;

FIG. 10 is a table illustrating variations for each LED panel;

FIG. 13 is a diagram illustrating a correspondence relation between an illumination apparatus and exposure amount correction information.

DESCRIPTION OF THE EMBODIMENTS

Figure 1:
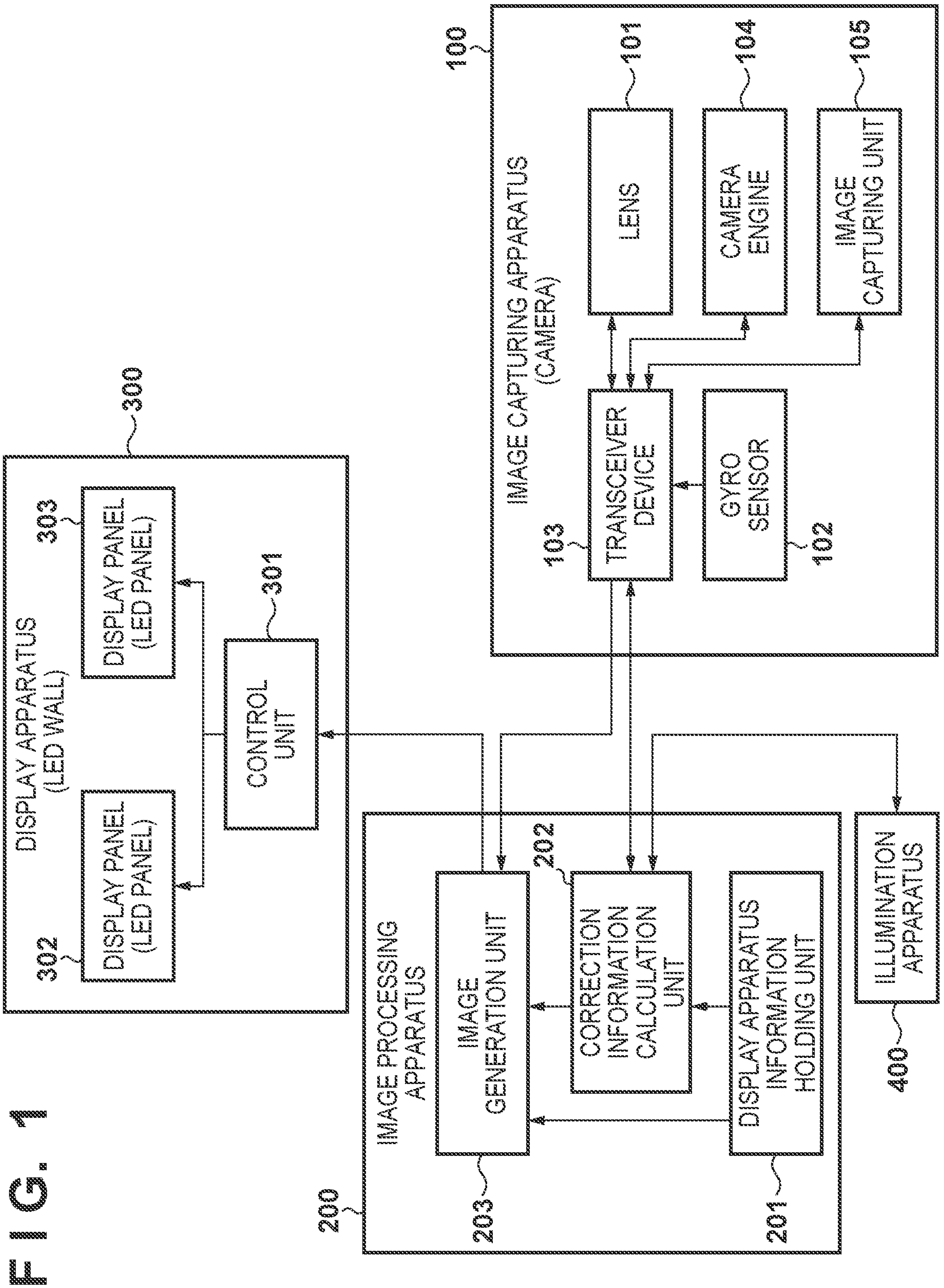
FIG. 1 is a system configuration diagram according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

First, an image processing system according to the present embodiment includes an image capturing apparatus, an image processing apparatus, and a display apparatus (LED wall). The image capturing apparatus includes a transmission and reception apparatus. The transmission and reception device then acquires focal length information of a lens of a camera, position information of the camera acquired from a gyro sensor, and information indicating a line-of-sight direction, and transmits the acquired information to the image processing apparatus as image capturing information. The image processing apparatus stores and holds display apparatus information such as information relating to arrangement of the display apparatus and information relating to individual differences of each display LED panel (display panel) arranged on the display apparatus. The image processing apparatus then generates correction information of an image to be displayed, based on the image capturing information and the display apparatus information received from the image capturing apparatus. The image processing apparatus then determines whether or not the generated correction information is within a luminance control range of the LED panel and, when the correction information is out of the luminance control range of the LED panel, the image processing apparatus corrects the image signal and transmits the corrected image to the LED panel. The foregoing will be described in more detail below.

FIG. 1 is an image system configuration diagram according to a first embodiment. As illustrated in FIG. 1, the system includes an image capturing apparatus 100, an image processing apparatus 200, a display apparatus (LED wall) 300, and an illumination apparatus 400.

The image capturing apparatus 100 has a function of transmitting the aforementioned image capturing information to the image processing apparatus 200. In addition, the image capturing apparatus 100 also has a function of capturing a subject including the display apparatus 300, and recording the captured image. The image capturing apparatus 100 therefore mounts a sensor, a focusing mechanism, a recording medium for recording an image, or the like, which are not illustrated.

The image processing apparatus 200 generates an image to be displayed on the display apparatus (LED wall) 300, based on the image capturing information (focal length information of the lens, position information, and information indicating the direction of the line-of-sight) received from the image capturing apparatus 100. Details of the processing performed by the image processing apparatus 200 and the configuration of the image processing apparatus 200 will be described later.

The display apparatus 300 is a large-scale display apparatus formed of a plurality of display panels (LED panels). It is assumed in the present embodiment for simplicity of description that the display apparatus 300 includes two LED panels 301 and 302. Needless to say, the number of LED panels forming the display apparatus 300 is not limited, and may be three or more. In addition, the arrangement method of the LED panels is not limited to the horizontal direction, and may be arranged two dimensionally in the vertical and the horizontal directions.

The illumination apparatus 400 is mainly used to illuminate a main subject (performer) in front of the background displayed on the LED wall 300 during image capturing. It is assumed in the present embodiment that the illumination apparatus 400 is controlled such that an output value of illumination is in a range from 0 to 100. It is assumed that the image processing apparatus 200 sets an output "50", which is a central value, as the initial state for the illumination apparatus 400.

The image capturing apparatus 100 includes a lens 101, a gyro sensor 102, a transmission and reception apparatus 103, a camera engine 104, and an image capturing unit 105. The lens 101 includes a plurality of lenses such as a zoom lens and a focus lens. The lens 101 then forms an image of a subject (performer) with a displayed image by the display apparatus 300 as a background on an image capturing surface of an image sensor included in the image capturing unit 105. Under the control of the camera engine 104, the image capturing unit 105 converts the formed image into an electric signal and records the electric signal in a recording medium (not illustrated). Here, it is assumed that the image capturing unit 105 performs image capturing at a frame rate of 30 frames/second, for example. The camera engine 104 changes the shutter speed per frame and the ISO sensitivity of the image capturing apparatus. In addition, the camera engine 104 also performs a development processing of the image captured by the image capturing unit 105. The gyro sensor 102 detects the position and orientation (i.e., the optical axis direction=line-of-sight direction of the lens) of the image capturing apparatus 100, and supplies the information obtained by detection to the transmission and reception apparatus 103.

The transmission and reception apparatus 103 compiles the current focal length of the lens 101, the sensor size information of the image capturing unit 105, and the position and orientation information obtained by the gyro sensor 102 (namely, information including the position and the line-of-sight direction of the image capturing apparatus 100) into image capturing information. The transmission and reception apparatus 103 then transmits the image capturing information to the image processing apparatus 200. Furthermore, the transmission and reception apparatus 103 changes the aperture value of the image capturing unit 105, based on the information from the image processing apparatus 200.

The image processing apparatus 200 includes a display apparatus information holding unit 201, a correction information calculation unit 202, and an image generation unit 203.

The display apparatus information holding unit 201 plays a role of holding display position information of the display apparatus 300 and characteristic information of the display apparatus. The display position information refers to arrangement information indicating a position at which a display panel (LED panel) forming the display apparatus 300 is located. Since the arrangement information is expressed in the same coordinate system as the camera position information and the line-of-sight information, an angle formed by the line-of-sight of the image capturing apparatus 100 and the line-of-sight of the LED wall 300 can be uniquely determined and calculated from the arrangement information and the image capturing information. In addition, the display apparatus information storage unit 201 according to the present embodiment also plays a role of holding, in addition to the display position information, individual difference information indicating individual differences of the LED panels and CG data to be displayed on the display apparatus 300. CG data refers to CG scene data for rendering CG. The CG scene data is image data rendered by the image generation unit 203.

The correction information calculation unit 202 generates correction information of the display apparatus 300, based on the image capturing information transmitted from the image capturing apparatus 100 and the arrangement information held in the display apparatus information storage unit 201. Details of the foregoing will be described later.

The image generation unit 203 renders the CG scene data stored in the display apparatus information storage unit 201, and generates image data that can be displayed on the display apparatus 300. The image generation unit 203 additionally superimposes, on the image data, the correction information calculated by the correction information calculation unit 202. The image data having the correction information superimposed thereon is transmitted to the LED wall 300.

Figure 2:
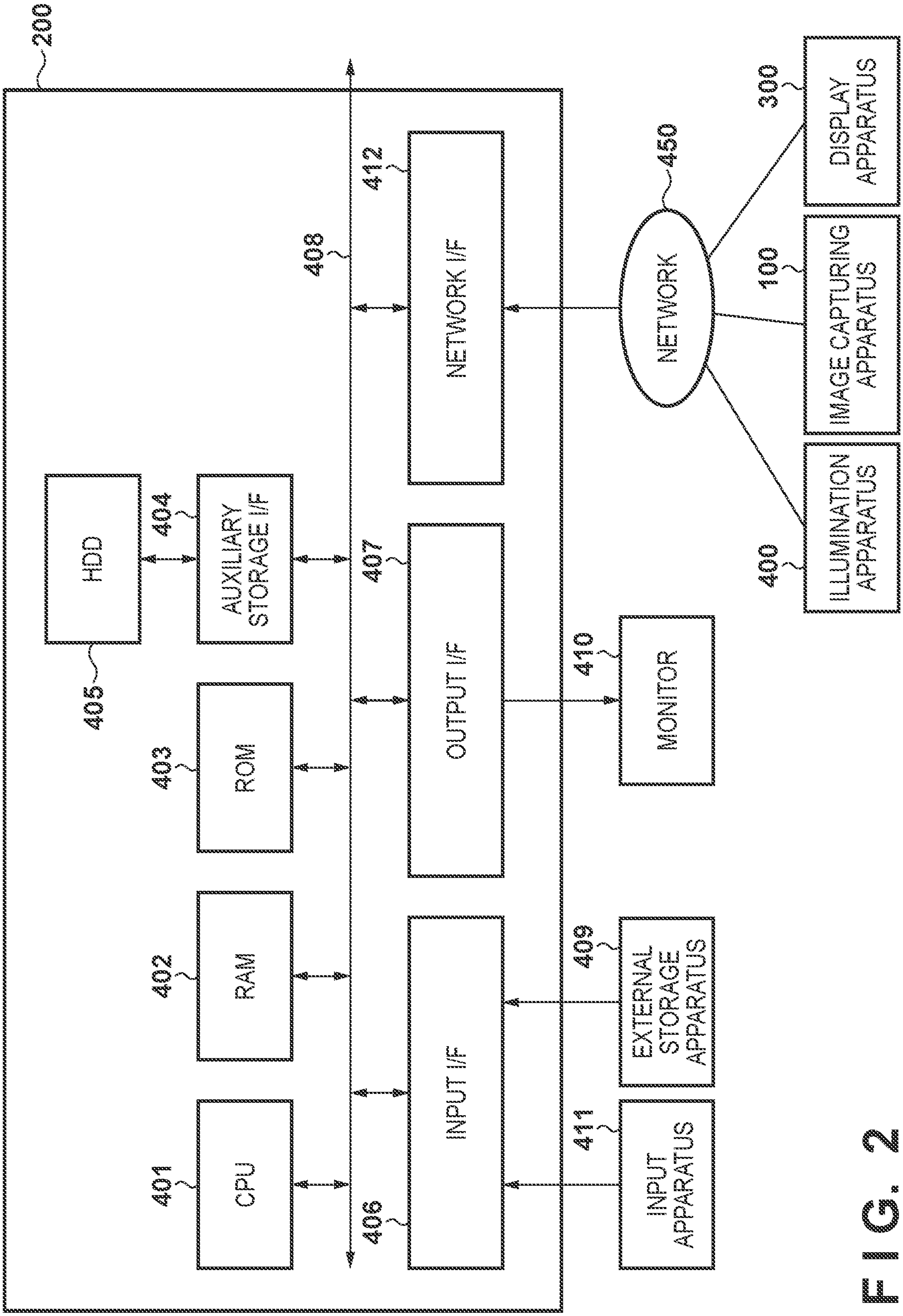
FIG. 2 is a specific hardware configuration diagram of an image processing apparatus.

FIG. 2 is a hardware configuration example of the image processing apparatus 200 according to the embodiment.

The image processing apparatus 200 includes a CPU 401, a RAM 402, a ROM 403, an auxiliary storage interface 404, an HDD 405, an input interface 406, an output interface 407, and a network interface 412. All of the components of the image processing apparatus 200 are connected to each other via a system bus 408. In addition, the image processing apparatus 200 is connected to an external storage apparatus 409 and an input apparatus 411 via the input interface 406. In addition, the image processing apparatus 200 is connected to a monitor 410 via the output interface 407.

The CPU 401, using the RAM 402 as a work memory, executes a program stored in the ROM 403 to comprehensively control each component of the image processing apparatus 200 via the system bus 408. Accordingly, various processing described below are executed. Note that, in addition to the CPU 401 and the RAM 402, a GPU configured to perform CG rendering for displaying an image on the LED wall 300, and a VRAM configured to store CG data (CG scene data, in the following) may also be provided. The HDD 405 is a storage apparatus that stores various types of data to be handled by the image processing apparatus 200. The CPU 401 writes data to the HDD 405 and reads data stored in the HDD 405, via the system bus 408. Various types of storage devices, besides an HDD, such as an optical disk drive or a flash memory may be used as the HDD 405.

The input interface 406 is a serial bus interface such as USB or IEEE1394, for example. Data and instructions or the like are input to the image processing apparatus 200 from an external apparatus via the input interface 406. The image processing apparatus 200 according to the present embodiment acquires data from the external storage apparatus 409 (e.g., a storage medium such as a hard disk, a memory card, a CF card, an SD card, a USB memory, etc.) via the input interface 406. In addition, the image processing apparatus 200 according to the present embodiment acquires, via the input interface 406, a user's instruction input to the input apparatus 411. The input apparatus 411, which is an input apparatus such as a mouse or a keyboard, receives an input of a user's instruction.

The output interface 407 is a serial bus interface such as USB or IEEE1394, similarly to the input interface 406. The output interface 407 may be an image output terminal such as for example, DVI or HDMI (trade name). The image processing apparatus 200 outputs data or the like to the external storage device via the output interface 407. The image processing apparatus 200 according to the present embodiment outputs data processed by the CPU 401 (e.g., real-time arrangement status of the camera and the display apparatus) to the monitor 410 (various types of image display devices such as a liquid crystal display) via the output interface 407.

The network interface 412 is an interface configured to connect to a network such as Ethernet. In the embodiment, the image processing apparatus 200 can communicate with the image capturing apparatus 100, the display apparatus 300, and the illumination apparatus 400 via the network interface 412. Here, it is only required that the image capturing apparatus 100, the image processing apparatus 200, the display apparatus 300, and the illumination apparatus 400 can communicate with each other, and therefore the form of connection may be USB or the like regardless of the type of communication interface, without being limited to the Ethernet interface. And thus the apparatuses may be connected via a combination of a plurality of types of interfaces, for example, the image processing apparatus 200 and the illumination apparatus 400 are connected via a different interface. In addition, communication may be of any type regardless of wired or wireless.

In addition, the image processing apparatus 200 also stores, via the system bus 408, the image capturing information, which is received from the image capturing apparatus 100 via the network interface 412, in the RAM 402.

Here, components of the image processing apparatus 200 are neither limited to those described above nor the main focus of the present embodiment, and therefore description thereof will be omitted. Alternatively, the image processing apparatus 200 can be configured by an apparatus such as a personal computer (PC) or a workstation. In this case, each processing unit implemented in the image processing apparatus 200 is realized by the CPU executing a program that will operate in the aforementioned PC.

The CPU 401 of the image processing apparatus 200 acquires position information, line-of-sight information, and focal length information of the image capturing apparatus 100 by receiving the image capturing information input from the image capturing apparatus 100. The CPU 401 then, based on each piece of acquired information, generates information for correcting the image to be displayed on the LED wall 300, causes the image generation unit 203 to generate an image to be displayed on the LED wall 300, and causes the generated image to be transmitted to the display apparatus 300. These processings are performed at timings controlled by a synchronization signal (not illustrated). Changes of the position and the line-of-sight of the image capturing apparatus 100 are acquired at intervals of the synchronization signal, correction information is generated by the image processing apparatus, superimposed on an image to be displayed on the display apparatus 300, and output.

Figure 3:
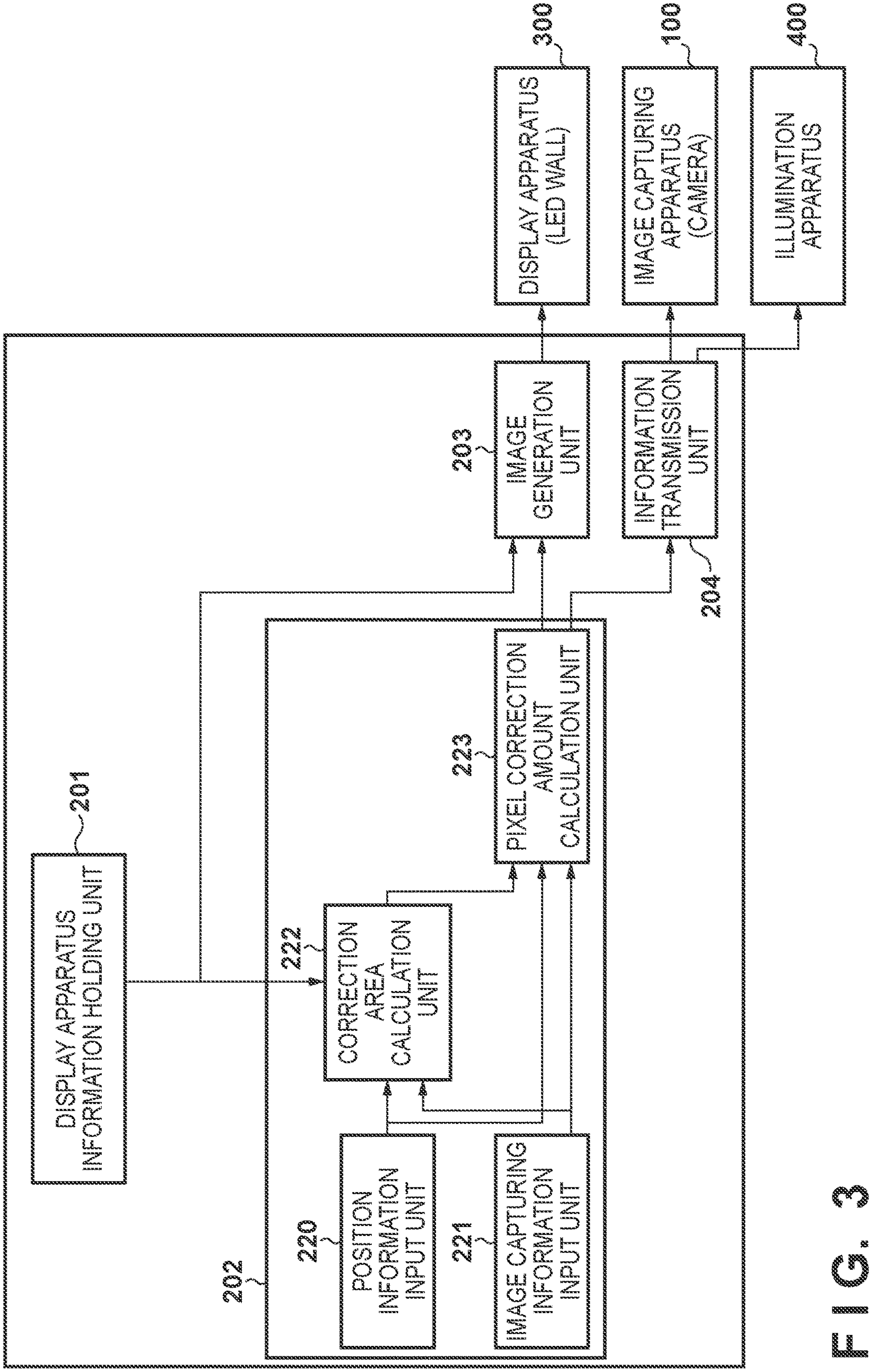
FIG. 3 is a functional configuration diagram of an image processing apparatus according to an embodiment.

FIG. 3 is a further detailed functional block diagram of the image processing apparatus 200 according to the present embodiment. It is to be understood that the display apparatus information storage unit 201 is implemented by the HDD 405 in FIG. 2, for example, and components other than the display apparatus information storage unit 201 (a correction area calculation unit 222, etc.) are implemented by the CPU 401 in FIG. 2 executing programs.

The display apparatus information holding unit 201 holds CG scene data and display position information of the display apparatus 300. The display position information is also associated with the CG scene data, and indicates at which coordinate position on the CG scene the display apparatus 300 is located. The position information input unit 220 receives, via the network interface 412, image capturing information (position and orientation, focal length or the like of the image capturing apparatus 100) from the transmission and reception apparatus 103 of the image capturing apparatus 100.

The image capturing information input unit 221 receives, via the network interface 412, the position and orientation information, the focal length information, and the sensor size information of the image capturing apparatus 100 included in the image capturing information received from the image capturing apparatus 100.

The correction area calculation unit 222 calculates a display area to be rendered on the display apparatus 300 from the position information and the line-of-sight information of the image capturing apparatus 100 input from the position information input unit 220 and the focal length information of the image capturing apparatus 100 input from the image capturing information input unit 221. The aforementioned area is a correction area in which the image to be displayed should be corrected.

A pixel correction amount calculation unit 223 calculates a correction amount of each LED pixel value on the LED panel forming the display apparatus 300. The pixel correction amount calculation unit 223 calculates the correction amount using the position information and the line-of-sight information of the image capturing apparatus 100 input from the position information input unit 220 and the image capturing information input unit 221, the correction area on the display apparatus 300 calculated by the correction area calculation unit 222, and the variation correction information of each LED panel of the display apparatus information 210. The correction amount of each LED pixel value calculated here is output to the image generation unit 203 as correction information.

When the exposure correction on the image capturing apparatus 100 is performed as a result of calculation by the pixel correction amount calculation unit 223, an information transmission unit 204 transmits exposure correction information relating to the exposure correction to the image capturing apparatus 100. In addition, the information transmission unit 204 transmits a control signal for performing illumination control on the illumination apparatus 400.

The control unit 301 of the display apparatus 300 displays an image by separating the image signals transmitted from the image generation unit 203 into image data to be displayed on each LED panel, and transmitting the image data to each LED panel. For example, when the display apparatus 300 is formed of two LED panels in a state of being arranged side-by-side as described in the present embodiment, the left half of the image signals are transmitted to the LED panel 302 and the right half are transmitted to the LED panel 303. Now assume that, for example, the display apparatus 300 can display an image of A pixels in the vertical direction and B pixels in the horizontal direction as a whole and the two LED panels are of a same size. Accordingly, the LED panel 302 conducts display of a pixel area of (0, 0) to (B/2−1, A−1) of the image, and the LED panel 303 conducts display of a pixel area of (B/2, 0) to (B−1, A−1). As described above, when the arrangement of LED panels is determined, it is determined at which position of which LED panel a certain pixel in the image to be displayed is to be reproduced. Here, the LED panel 302 (and also 303) is formed of a plurality of display elements (LED elements). In each of the LED elements, elements of three color components of, for example, Red (R), Green (G) and Blue (B) collectively form a single pixel. And, by causing elements of color components to emit light at designated positions on the LED panel 301 and the LED panel 302, based on image signals including the R, G and B color information of each pixel provided from the image generation unit 203, an image is displayed on the display screen formed of the LED panels 301 and 302.

[Processing Flow of Entire Image Processing Apparatus]

Figure 4:
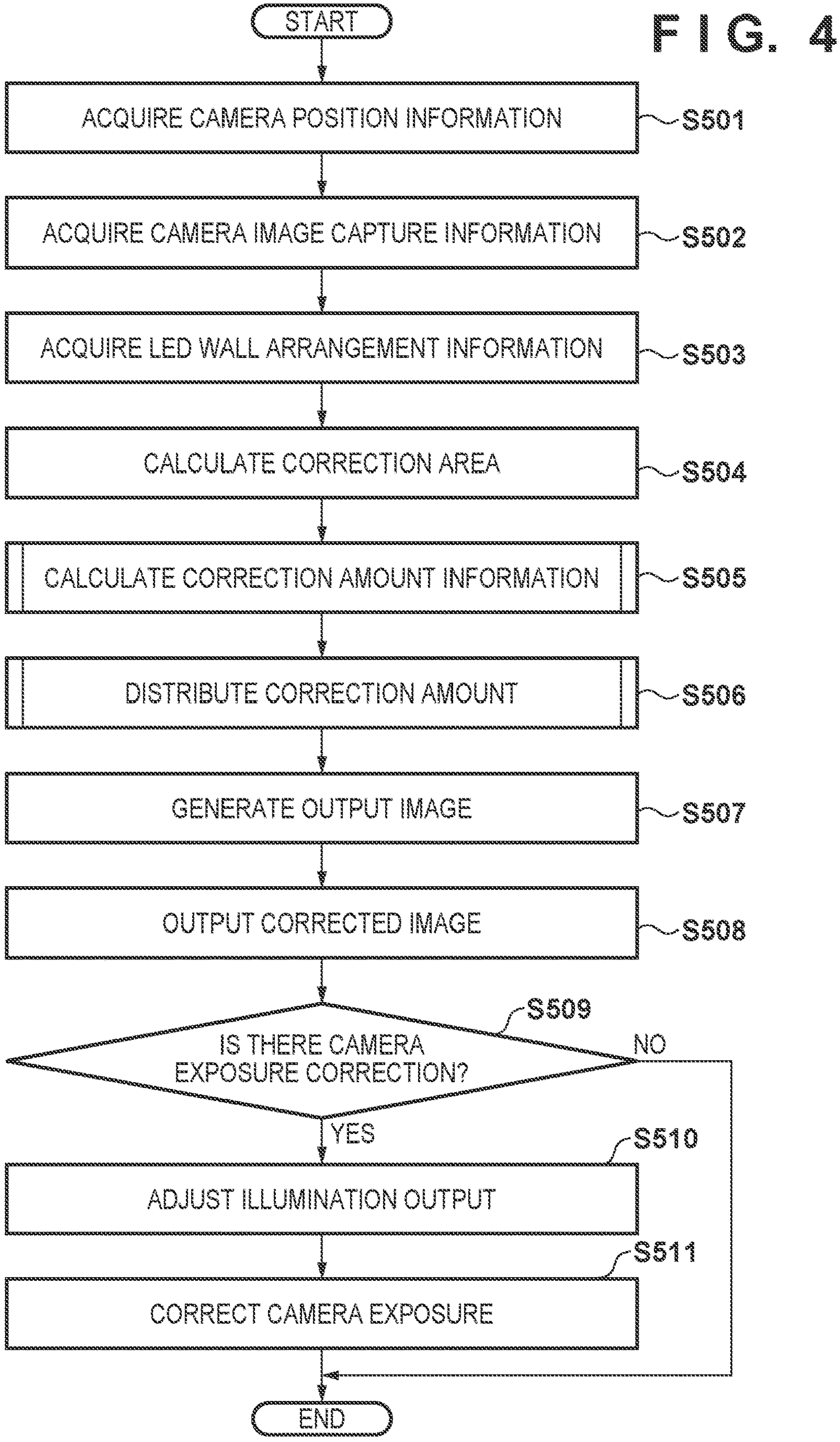
FIG. 4 is a flowchart illustrating a basic processing by the image processing apparatus according to an embodiment.

Next, a processing flow of the entire image processing apparatus 200 according to the present embodiment will be described, referring to the flowchart of FIG. 4.

At S501, the correction area calculation unit 222 acquires, from the image capturing apparatus 100, position information (including orientation) and line-of-sight information (information indicating the optical axis direction) of the image capturing apparatus 100.

At S502, the correction area calculation unit 222 acquires focal length information from the image capturing apparatus 100.

At S503, the correction area calculation unit 222 acquires arrangement information of the display apparatus 300 from the display apparatus information holding unit 201.

Figure 5:
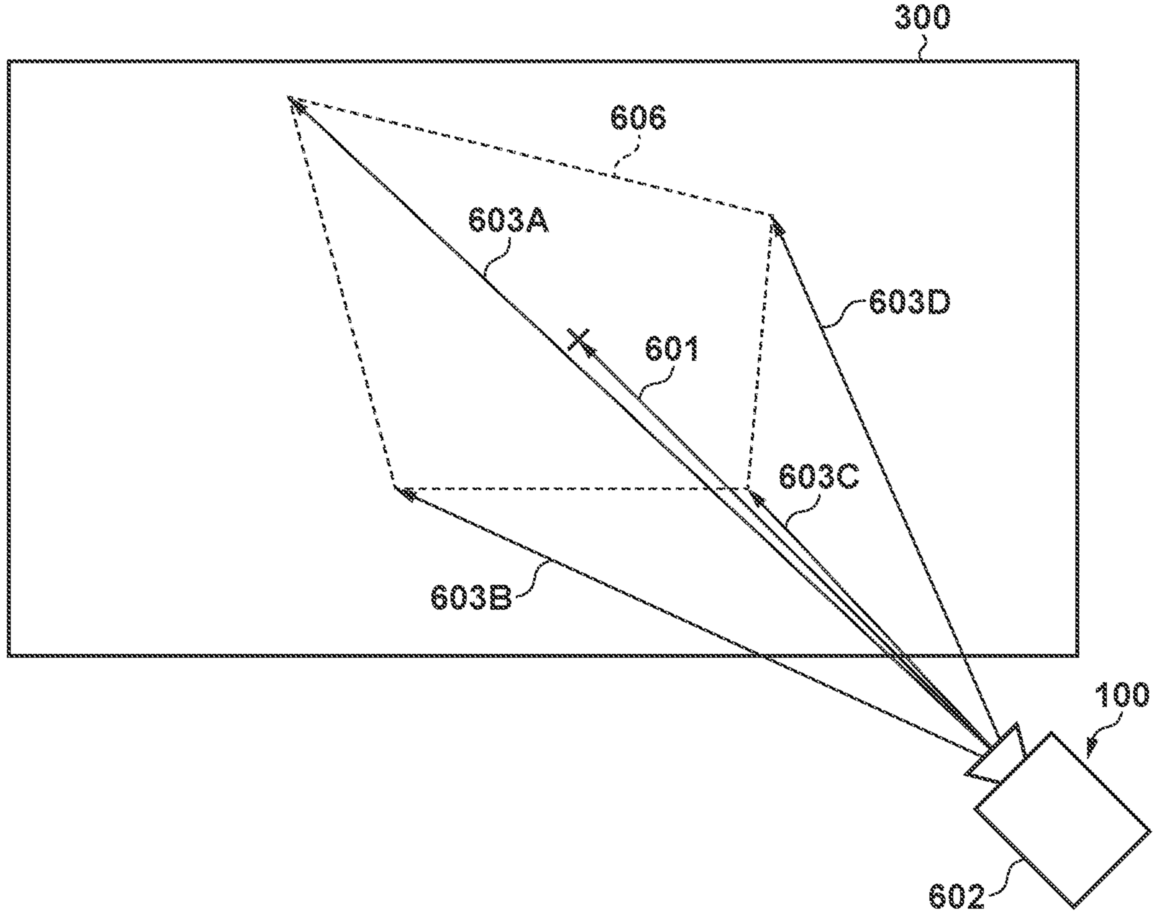
FIG. 5 is an explanatory diagram of method for obtaining correction area according to an embodiment.

At S504, the correction area calculation unit 222 calculates, based on the information acquired at S501 to S503, a correction area, which is an area on the display apparatus 300 included in the angle-of-view of image capturing by the image capturing apparatus 100. A specific example will be described, referring to FIG. 5. FIG. 5 is a front view of the display apparatus 300, illustrating a situation in which the image capturing apparatus 100 is capturing an image from an oblique direction. As illustrated in FIG. 5, the correction area calculation unit 222 determines four vectors 603A to 603D oriented from the image capturing lens of the image capturing apparatus 100 respectively toward the four corners of the angle-of-view, based on the focal length information, the sensor size information, the position and orientation 602 (i.e., the line-of-sight 601), and the line-of-sight direction 601 of the image capturing apparatus 100. The correction area calculation unit 222 then calculates respective intersection positions between the display surface of the display apparatus 300 and the four vectors 603A to 603D, and determines the area surrounded by the four intersection positions indicated by broken line as a correction area 606. Here, it may also be conceivable to employ a method that defines the correction area 606 to be an area expanded by a predetermined ratio in the vertical and horizontal directions in order to cover a sudden movement of the image capturing apparatus. The correction area calculation unit 222 outputs information representing the correction area 606 acquired by the aforementioned calculation to the pixel correction amount calculation unit 223.

At S505, the pixel correction amount calculation unit 223 calculates a correction amount of each pixel in the correction area 606 on the display apparatus 300, based on the information representing the correction area 606 calculated by the correction area calculation unit 222, and the position information and the line-of-sight information of the image capturing apparatus input from the position information input unit 220 (details will be described later).

At S506, the pixel correction amount calculation unit 223 calculates a correction amount of the display apparatus 300 and an exposure correction amount in the image capturing apparatus 100, based on the correction amount of each pixel calculated at S505. The pixel correction amount calculation unit 223 then outputs the calculated correction amount of the display apparatus 300 to the image generation unit 203 as pixel correction amount information. In addition, the pixel correction amount calculation unit 223 outputs the calculated exposure correction amount of the image capturing apparatus 100 to the information transmission unit 204 as exposure amount correction information. In addition, the pixel correction amount calculation unit 223 also stores the correction amount being output and the exposure correction amount in the RAM 402. Details of the calculation processing by the pixel correction amount calculation unit 223 will be described later.

At S507, the image generation unit 203 renders a CG scene to be displayed on the display apparatus 300, based on the CG scene data preliminarily stored in the display apparatus information holding unit 201. The CG scene may be only for within the correction area 606 on the display apparatus 300 output from the pixel correction amount calculation unit 223. The image generation unit 203 therefore executes rendering only on a part corresponding to the correction area 606. The image generation unit 203 then calculates a correction amount of the pixel value for each pixel in the correction area, based on the pixel correction amount information calculated at S505 and S506 by the pixel correction amount calculation unit 223 (details will be described later).

Subsequently, at S508, the image generation unit 203 transmits image data including the corrected pixel value data in the correction area to the display apparatus 300, and the image is displayed. At this time, the image generation unit 203 transmits pixel value information of only the pixels within the correction area, and therefore a method, in which a different image or nothing is displayed for other pixels, is applied. In some cases, the same data as that for the preceding time may be output to pixels outside the correction area.

At S509, the pixel correction amount calculation unit 223 determines whether or not the exposure amount correction of the image capturing apparatus 100 calculated at S506 is generated. When the exposure amount correction is generated, the pixel correction amount calculation unit 223 advances the processing to S510, or terminates the processing when the exposure amount correction is not generated.

At S510, the information transmission unit 204 adjusts the brightness of the illumination apparatus 400 illuminating the subject (performer) positioned on the foreground of the display apparatus 300, based on the exposure amount correction information calculated by the pixel correction amount calculation unit 223 and stored in the RAM 402. For example, a relation between the exposure correction amount of the image capturing apparatus 100 and the brightness of illumination is held as a table as illustrated in FIG. 13, and a value representing the brightness after adjustment is determined based on the exposure amount correction information and the current brightness information, and then the value being determined is output to the illumination apparatus 400. For example, assuming that the illumination apparatus 400 has been operating illumination of an output "50", and when the exposure amount correction information indicates +⅓ steps, the illumination output value is decreased by "5" to an output "45".

At S511, the information transmission unit 204 corrects the exposure of the image capturing apparatus 100, based on the exposure amount correction information calculated at S506. For example, when the exposure amount correction information is −⅓ steps, the information transmission unit 204 transmits information for reducing the shutter speed by ⅓ steps to the image capturing apparatus 100. Although the shutter speed is used for the exposure amount correction in the present description, other image capturing conditions (such as aperture value or ISO sensitivity) may be changed, or a plurality of items may be changed. The processing flow of the entire image processing apparatus 200 according to the present embodiment has been described above.

Figure 6:
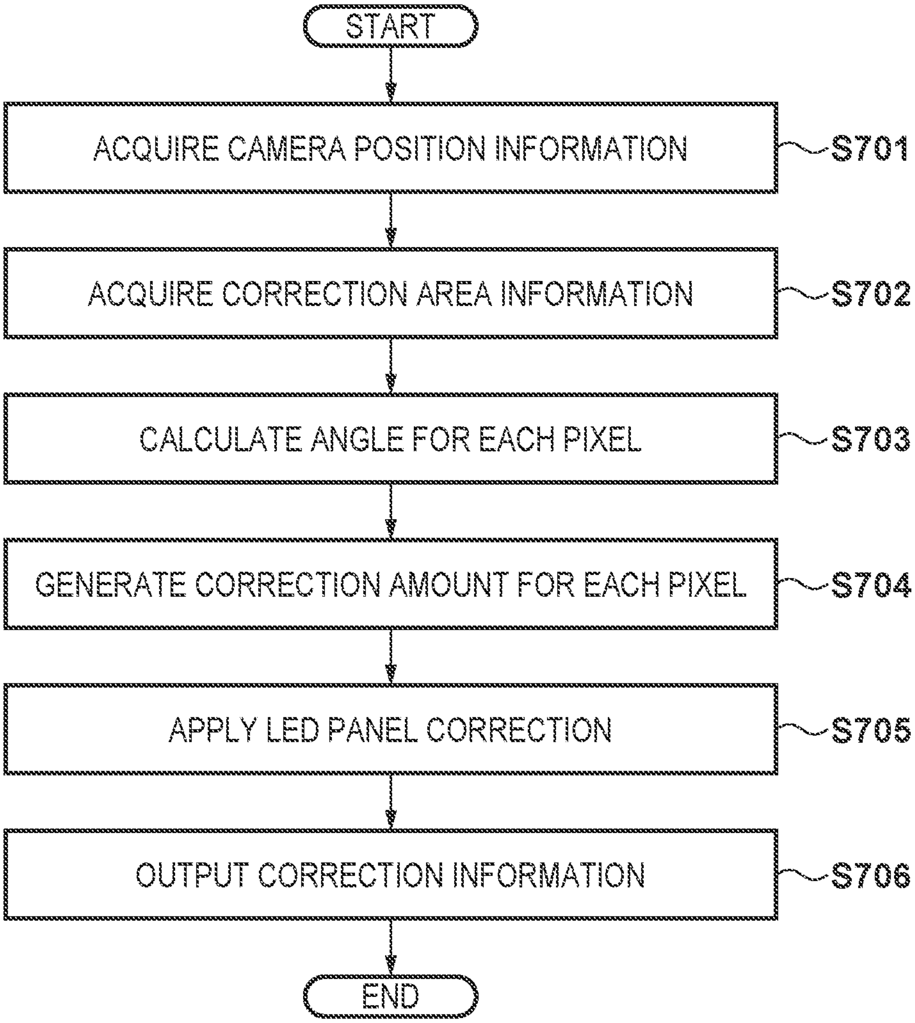
FIG. 6 is a flowchart illustrating a calculation processing of a pixel correction amount in a correction area of a display screen of a display apparatus according to an embodiment.

Next, the processing by the pixel correction amount calculation unit 223 at S505 in FIG. 4 will be described in detail, referring to the flowchart of FIG. 6.

At S701, the pixel correction amount calculation unit 223 acquires the position information and the line-of-sight information input from the image capturing apparatus 100.

At S702, the pixel correction amount calculation unit 223 acquires the correction area information calculated by the correction area calculation unit 222.

At S703, the pixel correction amount calculation unit 223 calculates, for each pixel in the correction area on the display apparatus 300, the angle between a normal vector 803 and the line-of-sight from the image capturing apparatus 100, from the position information and the line-of-sight information of the image capturing apparatus 100 acquired at S701 and the correction area information acquired at S702.

Figure 7:
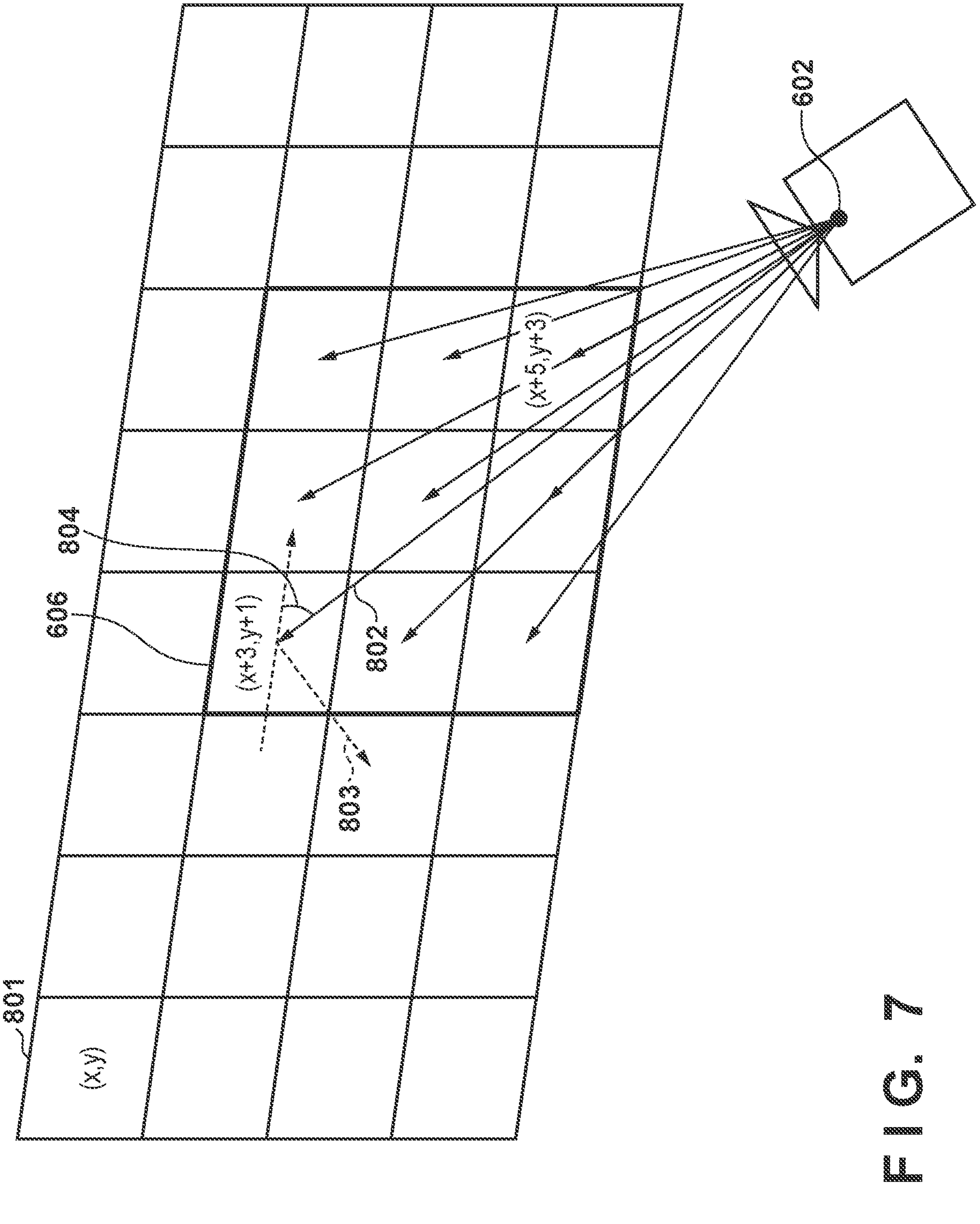
FIG. 7 is a conceptual diagram for calculating a specific pixel position from a correction area.

Specifically, the pixel correction amount calculation unit 223 calculates a specific position of the pixel from the correction area calculated at S504, as illustrated in FIG. 7. Here, assume that a reference numeral 801 indicates an LED element at coordinates (x, y) in the display apparatus 300. In addition, the LED element 801 corresponds to a single pixel of an image displayed by the display apparatus 300. For example, when the correction area 606 is an area indicated by a thick frame in FIG. 7 (depicted as a rectangle for ease of understanding), the area surrounded by the correction area 606 is an area of upper left corner coordinates (x+3, y+1) and lower right corner coordinates (x+5, y+3). At this time, the pixel correction amount calculation unit 223 calculates an angle 804 formed by a vector 802 connecting the position 602 of the image capturing apparatus 100 and the center of the LED element (x+3, y+1), and the plane of the correction area 606.

Figure 12:
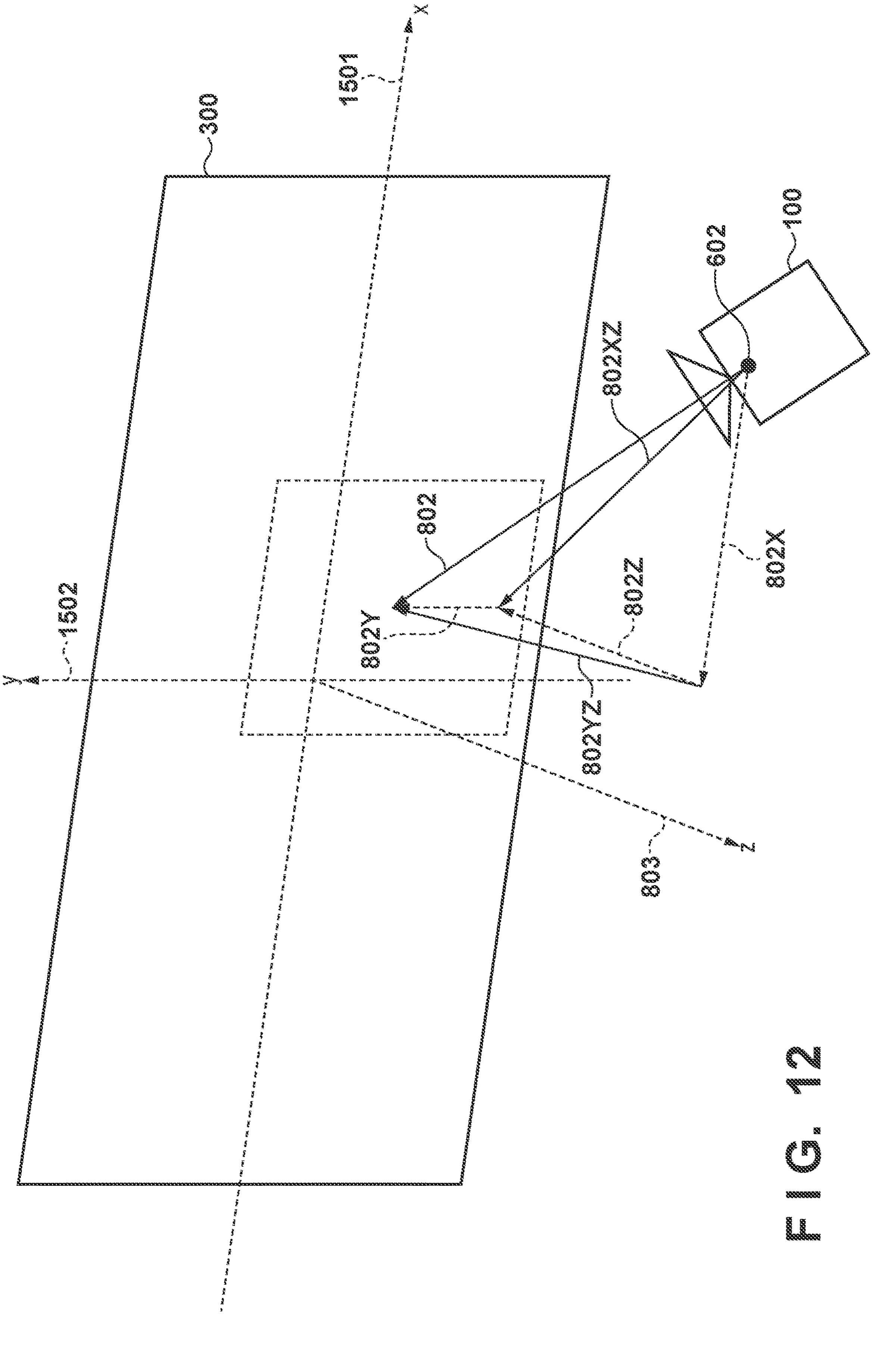
FIG. 12 is a conceptual diagram illustrating a method of calculating an angle between the image capturing apparatus and the LED element.

Similarly, the pixel correction amount calculation unit 223 calculates, for each pixel up to the coordinates (x+5, y+3), an angle formed by a vector connecting the position of the image capturing apparatus 100 and the center of LED element, and the correction area 606. For an angle being formed, i.e., in order to know a direction of image capturing with respect to the LED element, an x-axis 1501 that is orthogonally crossing the normal vector 803, parallel to the horizontal direction of the display apparatus 300, and positive in rightward direction, and a y-axis 1502 that is parallel to the vertical direction of the display apparatus 300 and positive in upward direction are defined, as illustrated in FIG. 12. At this time, the normal vector 803 is defined as a z-axis. Next, the pixel correction amount calculation unit 223 decomposes the vector 802 into three components, a movement amount 802X in the x-axis direction, a movement amount 802Y in the y-axis direction, and a movement amount 802Z in the z-axis direction. The pixel correction amount calculation unit 223 then calculates two vectors, namely, a vector 802XZ in the x-axis direction and a vector 802YZ in the y-axis direction, with the normal vector 803 as the center. And an angle $\theta_{XZ}$ formed by the vector 802XZ and the normal vector 803, and an angle $\theta_{YZ}$ formed by the vector 802YZ and the normal vector 803 are calculated. The two angles $\theta_{XZ}$ and $\theta_{YZ}$ are the angles being formed.

When the normal vectors 803 is denoted as $a=(a_1, a_2, a_3)$ and the vector 802 is denoted as $b=(b_1, b_2, b_3)$, the vector 803XZ is given as $a_{XZ}=(a_1, 0, a_3)$ and the vector 802YZ is given as $a_{YZ}=(0, a_2, a_3)$. Here, the angle $\theta_{XZ}$ formed by the vector 802XZ and the normal vector 803, and the angle $\theta_{YZ}$ formed by the vector 802YZ and the normal vector 803 can be calculated by the following equations (1) and (2).

[Equation 1]

$$\theta_{XZ} = \frac{a_1}{|a_1|} \times \frac{180}{\pi} \cos^{-1}\left(\frac{a_1 b_1 + a_3 b_3}{\sqrt{a_1^2 + b_1^2}\sqrt{a_3^2 + b_3^2}}\right) \quad (1)$$

$$\theta_{YZ} = \frac{a_2}{|a_2|} \times \frac{180}{\pi} \cos^{-1}\left(\frac{a_2 b_2 + a_3 b_3}{\sqrt{a_2^2 + b_2^2}\sqrt{a_3^2 + b_3^2}}\right) \quad (2)$$

Figure 11:
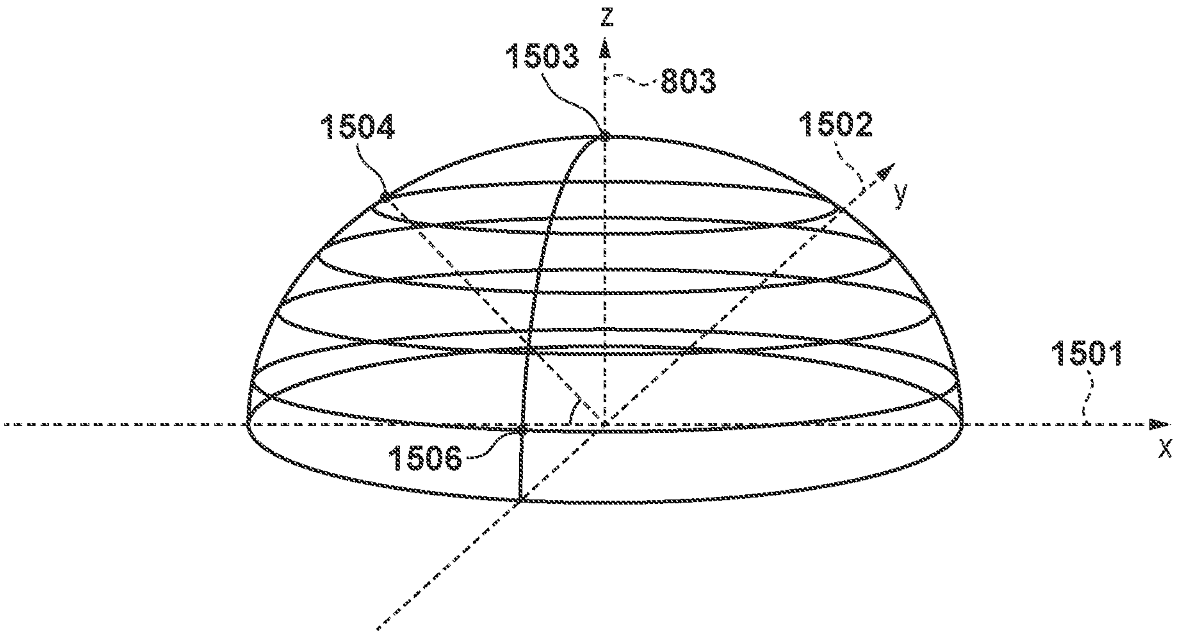
FIG. 11 is a conceptual diagram relating to a method of complementing the multi-angular property information.

At S704, the pixel correction amount calculation unit 223 calculates a correction amount of each pixel, based on the angle of each pixel calculated at S703. Specifically, the correction amount of the LED element may be determined depending on the angle by referring to a multi-angular property information table as illustrated in FIG. 9. The multi-angular property information is a table indicating a correction amount of a pixel value depending on an angle determined by the inclining degree and left or right position of the image capturing apparatus 100 capturing an image with respect to the display apparatus 300, with the angle being 0 when the display apparatus 300 and the image capturing apparatus 100 are facing each other without inclination. In FIG. 9, the table is illustrated for the LED elements such that a direction facing without inclination and parallel to the normal vector of the display surface of the display apparatus is 0 degree, positive degree for leftward direction and negative degree for rightward direction in the x-axis direction (described later). Although FIG. 9 illustrates only the multi-angular property information in the x-axis direction, the angle within a hemispherical range with the LED element at the center, as illustrated in FIG. 11 must actually be calculated as the line-of-sight vector from the camera to an LED element. For example, in FIG. 11 with the x-axis 1501, the y-axis 1502, and the z-axis being the normal vector 803, similarly to FIG. 12, the position of the display apparatus (LED wall) facing without inclination, i.e., the position being 0 degree is a point 1503. The points indicating the correction amount may be, with the normal vector 803 being the z axis as the center, negative in leftward and positive in rightward. For example, a point indicating minus 30 degrees in the x-axis direction is a point located leftward of the normal vector 803 by 30 degrees, and therefore is at the position of the point 1504. In addition, the multi-angular property information illustrated in FIG. 9 corresponds to an angle on a plane formed by the x-axis and the z-axis, as indicated by a point 1504 in FIG. 11. The LED element has angular dependency not only in the x-axis direction but also in the y-axis direction, multi-angular property information covering the y-axis direction can also be generated by, for example, rotating the multi-angular property information illustrated in FIG. 9 in counterclockwise by 180 degrees. At this time, as leftward and rightward correction coefficients are different, an interpolation calculation may be performed between a negative angle value and a positive angle value, in rotating counterclockwise by 180 degrees. For example, an average value of correction amounts of information of a point of minus 80 degrees and a point of plus 80 degrees corresponds to the point 1506 of minus 80 degrees in an angle on a plane defined by the y-axis and the z-axis. At this time, the y-axis is negative downward and positive upward. As such, it is possible to define the correction area 606 by interpolating a correction amount hemispherically around the normal vector 803 as the center.

Next, in the example illustrated in FIG. 7, assuming that the angle being formed 804 is $\theta_{XZ}$ plus 45 degrees and $\theta_{YZ}$ is 0 degrees, the light emitted from the LED element is oriented to the left referring to the camera position information and the position of the LED element, and therefore the part of plus 45 degrees in FIG. 9 is referred. In addition, in a single LED element, a pixel is formed of three types of Red (R), Green (G) and Blue (B), and therefore correction amounts are held one for each piece of the color information R, G, and B. There are angles of 30, 45, 60 and 80 degrees in FIG. 9, and therefore an angle larger than 80 degrees may use equivalent data with 80 degrees and for an intermediate angle between 80 degrees and 60 degrees may be obtained by calculating a linear interpolation value from the data of 80 degrees and 60 degrees, for example. In addition, the correction amount information by an angle may have a detailed stepping width (every one degree or the like) than that in FIG. 9 and, when the display apparatus 300 includes an LED element of a color other than R, G and B, such as a white LED (W), a correction amount for a different color may additionally be held. When, for example, a white LED (W) is provided in addition to R, G and B, a W-element correction amount may be provided together with the correction amounts of the R-element, G-element and B-element.

At S705, the pixel correction amount calculation unit 223 performs correction of the influence of individual differences between LED panels on the correction amount of each pixel that has been calculated until S704. The brightness output from LED panels may be different even when a same image signal is provided, due to cause such as variation in the accuracy of components during manufacturing. Therefore, three types of correction coefficients for Red (R), Green (G) and Blue (B) are provided as individual difference information for each panel. Specifically, correction coefficients (ratio) of R, G, and B with respect to a preliminarily set reference value of brightness are provided for each panel position, as illustrated in FIG. 10. When the display position of the pixel (x, y) in the image is specified, a corresponding panel can be identified. In other words, values of the correction coefficients can be obtained by the pixel position.

At S706, the pixel correction amount calculation unit 223 outputs, to the image generation unit 203, the correction amount data of each pixel calculated until S705.

Figure 8:
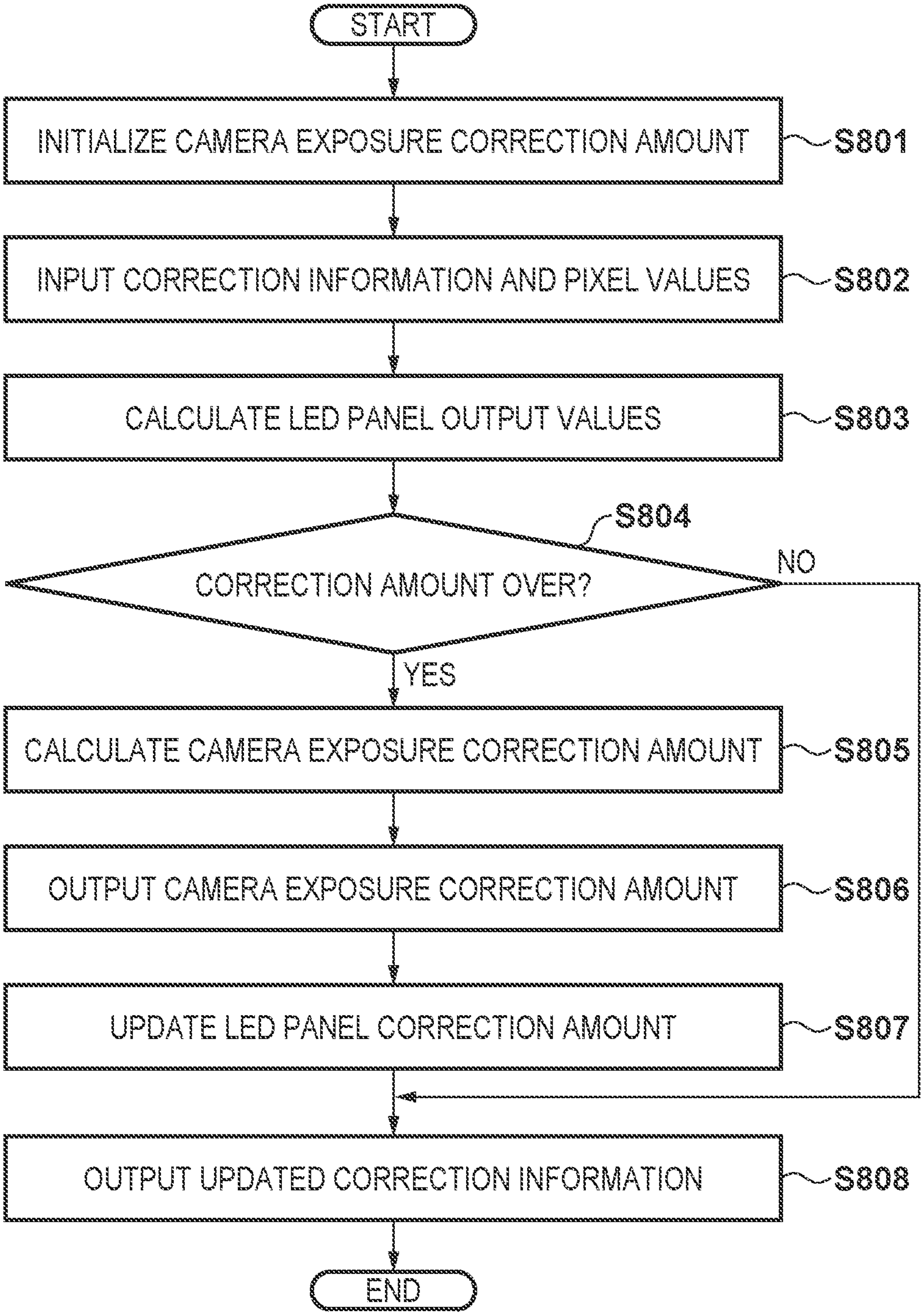
FIG. 8 is a flowchart illustrating a flow of a correction amount distribution processing.

Next, the processing performed by the pixel correction amount calculation unit 223 at S506 in FIG. 4 will be described in detail, referring to the flowchart of FIG. 8.

At S801, the pixel correction amount calculation unit 223 returns the exposure correction amount of the image capturing apparatus 300 to the initial value. Specifically, the pixel correction amount calculation unit 223 sets the exposure correction amount to 0.

At S802, the pixel correction amount calculation unit 223 inputs the correction amount data of each pixel calculated at S505. In addition, the pixel correction amount calculation unit 223 inputs each pixel value in the correction area rendered by the image generation unit 203.

At S803, the pixel correction amount calculation unit 223 calculates a pixel value of each pixel to be output to the display apparatus 300 from the correction amount data of each pixel input at S802 and each pixel value in the correction area. Specifically, the pixel correction amount calculation unit 223 sets, as a corrected pixel value after correction, a value obtained by multiplying the pixel value in the correction area by the correction amount data of each pixel.

At S804, the pixel correction amount calculation unit 223 refers to the maximum value among the pixel values calculated for each pixel, and determines whether or not the maximum value exceeds the maximum pixel value controllable by the display apparatus 300.

For example, assume that the display apparatus 300 controls pixel values by 8 bits. And assume that the value of a certain pixel in the correction area rendered by the image generation unit 203 is "217" and the correction amount of the pixel is "1.20". In this case, the corrected pixel value is "260" (=217×1.20), which exceeds the maximum value "255" of 8 bits that can be input by the display apparatus 300. Therefore, in the case of this example, the pixel correction amount calculation unit 223 determines at S804 that the corrected pixel value exceeds the controllable maximum pixel value.

At S804, the pixel correction amount calculation unit 223 advances the processing to S805 when determining that the correction amount is exceeding, or advances the processing to S808 when determining that the correction amount is not exceeding.

At S805, the pixel correction amount calculation unit 223 calculates an exposure correction amount of the image capturing apparatus 100. Specifically, the pixel correction amount calculation unit 223 generally reduces the pixel values of the display apparatus 300, when the corrected pixel value is exceeding the maximum value of 8 bits controllable by the display apparatus 300. The pixel correction amount calculation unit 223 then compensates the reduced amount by the exposure of the image capturing apparatus 100. This is for maintaining the brightness of the entire image. For example, the pixel correction amount calculation unit 223 multiplies the brightness of the entire image by 0.794 and, as compensation, increases the exposure of the image capturing apparatus 100 by ⅓ steps to maintain the brightness of the entire image. When, for example, the corrected pixel value at a certain pixel position of the display apparatus 300 is "260", the pixel correction amount calculation unit 223 multiplies all pixel values of an image (an image of a correction area) to be displayed on the display apparatus 300 by 0.794 (in the following, an image with all the pixel values in the correction area being multiplied by 0.794 is referred to as "pixel correction information"). As a result, the aforementioned pixel value becomes "206". Here, a pixel value multiplied by 0.794 may exceed the maximum value of 8 bits. In such a case, the pixel correction amount calculation unit 223 further multiplies the pixel value by 0.794, further increases the exposure of the image capturing apparatus 100 by ⅓ steps, and checks whether or not the pixel value exceeds the maximum value. The pixel correction amount calculation unit 223 thus repeats the correction calculation until the value becomes equal to or lower than the maximum value of 8 bits, and increases the exposure correction amount of the image capturing apparatus 100 at each correction calculation.

At S806, the pixel correction amount calculation unit 223 stores in the RAM 402 and outputs to the information transmission unit 204, the exposure correction amount of the image capturing apparatus 100 acquired by the calculation at S805. The information transmission unit 204 transmits the exposure correction amount input from the pixel correction amount calculation unit 223 to the image capturing apparatus 100. The image capturing apparatus 100 will correct the exposure in accordance with the exposure correction amount, and perform image capturing.

At S807, the pixel correction amount calculation unit 223 updates each pixel value in the correction area obtained at S803 by the pixel correction amount information calculated at S805.

At S808, the pixel correction amount calculation unit 223 outputs the pixel correction amount information to the image generation unit 203. When the determination at S804 is No, the pixel correction amount information is image information having the pixel value calculated at S803, and this causes the image capturing apparatus 100 to maintain the initial exposure amount. On the other hand, when the determination at S804 is Yes, the pixel correction amount information is image information having a pixel value acquired by the updating processing at S807.

The image generation unit 203 renders an image to be displayed on the display surface (two LED panels in the present embodiment) of the display apparatus 300, based on the CG scene data stored in the display apparatus information 210, and the arrangement information of the display apparatus 300. At this time, for the image to be displayed, the display position of a CG scene is determined from the arrangement information of the display apparatus 300 associated with the CG scene data. The image generation unit 203 then multiplies the rendered image by the correction amount of each pixel calculated by the correction amount calculation unit 202, and transmits the image data acquired as a result of multiplying to the display apparatus 300. For example, when the pixel values at the position of a certain pixel (a, b) are (R, G, B)=(100, 100, 150) as a result of rendering, the correction amounts are (1.12, 1.11, 1.19), and the panel position is at (1, 1), the corrected pixel values are obtained to be (R', G', B')=(113, 113, 181).

As has been described above, according to the present embodiment, an image on the LED wall can be displayed in a constant brightness in an image captured by the camera, not depending on the relative positional relation between the image capturing apparatus 100 and the display apparatus 300, and variations of brightness of the LED panels included in the display apparatus 300.

In the aforementioned embodiment, individual differences between LED panels 302 and 303 included in the display apparatus 300 are preliminarily stored. However, a method may be employed in which the influence of individual difference is parameterized by measurement before using the display apparatus 300. For example, an individual difference information generation unit (not illustrated) may be provided in the image processing apparatus 200, and the individual difference information generation unit may generate individual difference information, based on the image data, obtained from the image capturing apparatus 100, of the LED panels included in the display apparatus 300. Specifically, a preliminarily prepared test chart may be displayed on the display apparatus 300 and captured by the image capturing apparatus 100. At this time, it suffices to hold the ratio of the average values of the pixels in the chart portion of each LED panel. For this case, measurement can be performed with high precision by displaying the LED panels 302 and 303 included in the display apparatus 300 one by one, and installing the image capturing apparatus 100 facing without inclination to each LED panel and in a position with each LED panel located at the center of the angle-of-view, and capturing an image. Noted that, a single color chart using signal values such as gray, red, green and blue that cause the LED panel to display a uniform color may be used as the test chart.

Here, in the aforementioned embodiment, the visual field range of the image capturing apparatus 100 within the display screen of the display apparatus 300 is defined as the correction area, and correction is performed on pixel values in the correction area. However, when the display screen of the image processing apparatus 200 is sufficiently larger than the maximum angle-of-view of the image capturing apparatus 100 and the computing power of the image processing apparatus is sufficient, the image processing apparatus 200 does not need information about the angle-of-view (focal length) of the image capturing apparatus 100, and all display pixels of the display screen of the display apparatus 300 may be corrected by information indicating the position and orientation (position and optical axis direction) of the image capturing apparatus.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-179740, filed Nov. 9, 2022, which is hereby incorporated by reference herein in its entirety.

What is claimed is:

1. An image processing apparatus comprising:

at least one processor and at least one memory, the at least one processor and at least one memory being configured to function as a plurality of units comprising:

(A) an acquisition unit configured to acquire information relating to position and orientation of an image capturing apparatus configured to capture an image of a subject with an image displayed on a display apparatus as a background;

(B) a calculation unit configured to calculate a correction coefficient corresponding to each display element included in the display apparatus, based on display position of the display apparatus and the information acquired by the acquisition unit;

(D) a correction unit configured to correct, by the correction coefficient calculated by the calculation unit, a pixel value of each pixel in an image displayed on the display apparatus; and (E) a control unit configured to (1) control the correction unit, (2) output an image being corrected to the display apparatus, and (3) generate and output correction information relating to exposure with respect to the image capturing apparatus, wherein the control unit includes a determination unit configured to determine whether or not the image corrected by the correction unit includes a pixel with a value exceeding a maximum value that can be input to the display apparatus, wherein when a determination result of the determination unit indicates that the image being corrected does not include any pixel with a value exceeding the maximum value that can be input to the display apparatus, the control unit (1) outputs the image being corrected to the display apparatus and (2) maintains an initial exposure amount with respect to the image capturing apparatus, and wherein when the determination result of the determination unit indicates that the image being corrected includes a pixel with a value exceeding the maximum value that can be input to the display apparatus, the control unit (1) outputs, to the display apparatus, an image obtained by performing re-correction on the image being corrected such that the pixel value becomes equal to or lower than the maximum value, and (2) generates and outputs, to the image capturing apparatus, correction information for increasing the exposure amount based on the re-correction.

2. The image processing apparatus according to claim 1, wherein the display apparatus includes a display screen that is formed by arranging one or more display panels each of which is constituted by a display element having a brightness characteristic depending on an angle.

3. The image processing apparatus according to claim 2, wherein the calculation unit obtains, based on the display position of the display apparatus and the information acquired by the acquisition unit, a vector oriented from each of the display elements toward the image capturing apparatus, and calculates the correction coefficient that depends on the characteristic for each display element.

4. The image processing apparatus according to claim 2, wherein the display element is a Light Emitting Diode (LED) element, and wherein the display panel is an LED panel.

5. The image processing apparatus according to claim 1, wherein the control unit further generates information indicating an intensity of illumination for an external illumination apparatus and outputs the information to the external illumination apparatus.

6. The image processing apparatus according to claim 1, wherein the acquisition unit further acquires information relating to an angle-of-view from the image capturing apparatus, wherein the calculation unit includes a determination unit configured to determine, based on (1) the position of the display apparatus, (2) the position and orientation of the image capturing apparatus, and (3) the information relating to the angle-of-view, an area included in the angle-of-view on a display screen as a correction area, and wherein the calculation unit calculates the correction coefficient in the correction area.

7. The image processing apparatus according to claim 6, wherein the plurality of units further comprises a unit configured to acquire information representing individual differences relating to light emission of each display panel included in the display screen of the display apparatus, and wherein the correction unit further corrects the image being corrected, based on the information representing the individual differences for each display panel.

8. The image processing apparatus according to claim 7, wherein the information representing the individual differences is information indicating a ratio of brightness to a reference value of each of red (R), green (G), and blue (B) of each display panel.

9. The image processing apparatus according to claim 1, wherein the correction unit generates and corrects an image displayed on the display apparatus by rendering based on Computer Graphics (CG) data stored in a storage unit.

10. The image processing apparatus according to claim 1, further comprising an output unit configured to output the image corrected by the correction unit to the display apparatus.

11. A control method for an image processing apparatus, the control method comprising:

acquiring information relating to position and orientation of an image capturing apparatus configured to capture an image of a subject with an image displayed on a display apparatus as a background;

calculating a correction coefficient corresponding to each display element included in the display apparatus, based on display position of the display apparatus and the information being acquired;

correcting, by the correction coefficient being calculated, a pixel value of each pixel in an image displayed on the display apparatus;

determining whether or not an image corrected by the correcting includes a pixel with a value exceeding a maximum value that can be input to the display apparatus;

when it is determined that the image being corrected does not include any pixel with a value exceeding a maximum value that can be input to the display apparatus, (1) outputting the image being corrected to the display apparatus and (2) maintaining an initial exposure amount with respect to the image capturing apparatus; and when it is determined that the image being corrected includes a pixel with a value exceeding the maximum value that can be input to the display apparatus, (1) outputting, to the display apparatus, an image obtained by performing re-correction on the image being corrected such that the pixel value becomes equal to or lower than the maximum value, and (2) generating and outputting, to the image capturing apparatus, correction information for increasing the exposure amount based on the re-correction.

12. A non-transitory computer-readable storage medium storing a computer program configured to, when the computer program is read and executed by a computer, cause the computer to:

acquire information relating to position and orientation of an image capturing apparatus configured to capture an image of a subject with an image displayed on a display apparatus as a background;

calculate a correction coefficient corresponding to each display element included in the display apparatus, based on the display position of the display apparatus and the information being acquired;

correct, by the correction coefficient being calculated, a pixel value of each pixel in an image displayed on the display apparatus;

determine whether or not an image corrected by the correcting includes a pixel with a value exceeding a maximum value that can be input to the display apparatus;

when it is determined that the image being corrected does not include any pixel with a value exceeding a maximum value that can be input to the display apparatus, (1) output the image being corrected to the display apparatus and (2) maintain an initial exposure amount with respect to the image capturing apparatus; and when it is determined that the image being corrected includes a pixel with a value exceeding the maximum value that can be input to the display apparatus, (1) output, to the display apparatus, an image obtained by performing re-correction on the image being corrected such that the pixel value becomes equal to or lower than the maximum value, and (2) generate and output, to the image capturing apparatus, correction information for increasing the exposure amount based on the re-correction.

* * * * *